United States Patent
Li

(10) Patent No.: US 12,507,113 B2
(45) Date of Patent: Dec. 23, 2025

(54) DATA TRANSMISSION METHOD, RELATED NETWORK NODE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Aihua Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 393 days.

(21) Appl. No.: 18/040,970

(22) PCT Filed: Jul. 2, 2021

(86) PCT No.: PCT/CN2021/104167
§ 371 (c)(1),
(2) Date: Feb. 7, 2023

(87) PCT Pub. No.: WO2022/028170
PCT Pub. Date: Feb. 10, 2022

(65) Prior Publication Data
US 2023/0308933 A1     Sep. 28, 2023

(30) Foreign Application Priority Data
Aug. 7, 2020 (CN) .......................... 202010790977.3

(51) Int. Cl.
*H04W 28/02* (2009.01)
*H04M 15/00* (2006.01)

(52) U.S. Cl.
CPC ....... *H04W 28/0263* (2013.01); *H04M 15/66* (2013.01)

(58) Field of Classification Search
CPC ..... H04W 28/0263; H04W 4/24; H04W 8/14; H04W 28/12; H04M 15/66; H04L 12/14; H04L 12/1407
(Continued)

(56) References Cited

U.S. PATENT DOCUMENTS

2011/0228744 A1   9/2011  Cai
2019/0394279 A1*  12/2019  Dao .................... H04W 48/04
(Continued)

FOREIGN PATENT DOCUMENTS

CN    108419270 A    8/2018
CN    109982391 A    7/2019
(Continued)

OTHER PUBLICATIONS

INTEL. "Solution of Encrypted Traffic Detection for key issue#1 with agreement between AF and MNO" S2-183045, SA WG2 Meeting #S2-126, Feb. 26-Mar. 2, 2018, Montreal, Canada (e-mail revision 3 of S2-182484), Mar. 9, 2018 (Mar. 9, 2018).see pp. 2-5.
(Continued)

*Primary Examiner* — Obaidul Huq
(74) *Attorney, Agent, or Firm* — Syncoda LLC; Feng Ma

(57) ABSTRACT

A data transmission method includes that: a first network node identifies an application identifier corresponding to second flow information of a packet flow; and when it is determined that 3-tuple information corresponding to the packet flow is changed from first 3-tuple information to second 3-tuple information, or is newly added second 3-tuple information, sending second packet flow description (PFD) information of the packet flow to a third network
(Continued)

---

101 — A first network node identifies an application Identifier (ID) corresponding to second flow information of a packet flow 102 — Second Packet Flow Description (PFD) information of the packet flow is sent to a third network node in response to determining that 3-tuple information corresponding to the packet flow is changed from first 3-tuple information to second 3-tuple information or is newly added second 3-tuple information, where the second PFD information includes the second 3-tuple information and the application ID node, where the second PFD information includes the second 3-tuple information and the application identifier.

13 Claims, 8 Drawing Sheets

(58) Field of Classification Search
USPC .......................................... 370/310, 328, 329
See application file for complete search history.

(56) References Cited

U.S. PATENT DOCUMENTS

| | | | |
|---|---|---|---|
| 2020/0112907 A1 | 4/2020 | Dao | |
| 2020/0336321 A1 | 10/2020 | Ding | |
| 2021/0289390 A1* | 9/2021 | Zhou | ................. H04W 28/0933 |
| 2023/0262098 A1* | 8/2023 | Muñoz De La Torre Alonso | ....... H04L 47/822 709/224 |

FOREIGN PATENT DOCUMENTS

| | | |
|---|---|---|
| CN | 110324800 A | 10/2019 |
| CN | 111031517 A | 4/2020 |
| IN | 110580256 A | 12/2019 |
| WO | 2020104048 A1 | 5/2020 |

OTHER PUBLICATIONS

International Search Report in the international application No. PCT/CN2021/104167, mailed on Oct. 9, 2021.
English translation of the Written Opinion of the International Search Authority in the international application No. PCT/CN2021/104167, mailed on Oct. 9, 2021.
First Office Action of the Chinese application No. 202010790977.3, issued on Jun. 15, 2022.
3GPP TS 23.501 V16.4.0 (Mar. 2020), "3rd Generation Partnership Project; Technical Specification Group Services and System Aspects; System architecture for the 5G System (5GS); Stage 2 (Release 16)".
3GPP TS 23.502 V16.4.0 (Mar. 2020), "3rd Generation Partnership Project; Technical Specification Group Services and System Aspects; Procedures for the 5G System (5GS); Stage 2 (Release 16)".
3GPP TS 23.503 V16.4.0 (Mar. 2020), "3rd Generation Partnership Project; Technical Specification Group Services and System Aspects; Policy and charging control framework for the 5G System (5GS); Stage 2 (Release 16)".
3GPP TS 23.288 V16.3.0 (Mar. 2020), "3rd Generation Partnership Project; Technical Specification Group Services and System Aspects; Architecture enhancements for 5G System (5GS) to support network data analytics services (Release 16)".
3GPP TR 23.700-91 V0.4.0 (Jun. 2020), "3rd Generation Partnership Project; Technical Specification Group Services and System Aspects; Study on enablers for network automation for the 5G System (5GS); Phase 2 (Release 17)".
Intel, "Solution of Encrypted Traffic Detection for key issue#1 with agreement between AF and MNO", SA WG2 Meeting #S2-126 S2-182484 Feb. 26-Mar. 2, 2018, Montreal, Canada.

* cited by examiner

DATA TRANSMISSION METHOD, RELATED NETWORK NODE AND STORAGE MEDIUM

CROSS-REFERENCE TO RELATED APPLICATIONS

This application is a U.S. National Stage of International Application No. PCT/CN2021/104167 filed on Jul. 2, 2021, which claims priority to Chinese Patent Application No. 202010790977.3, filed on Aug. 7, 2020. The disclosures of the above-referenced applications are hereby incorporated by reference in their entirety.

TECHNICAL FIELD

The present disclosure relates to the technical field of mobile communications, and in particular to a data transmission method, a related network node and a storage medium.

BACKGROUND

A Network Data Analytics Function (NWDAF) can only analyze that an Internet Protocol (IP) 3-tuple corresponds to a traffic, but cannot determine an Application Identifier (ID) thereof.

In a processing flow, an Application Function (AF) provides the Application ID and Packet Flow Description (PFD) information for a Network Exposure Function (NEF), the NEF sends the Application ID and the PFD information to a Session Management Function (SMF), and the SMF further sends a Packet Detection Rule (PDR) to a User Plane Function (UPF) for the detection and reporting of the Application ID.

However, the AF adds or changes the IP 3-tuple more frequently, and fails to notify the NEF after change and send same to the UPF through the SMF, thus affecting the accurate parsing of a data message and the execution of related Policy Control and Charging (PCC).

SUMMARY

Embodiments of the present disclosure provide a data transmission method, a related network node and a storage medium.

The technical solutions of the embodiments of the present disclosure are implemented as follows.

In a first aspect, the embodiments of the present disclosure provide a data transmission method, which includes the following operations.

A first network node identifies an application ID corresponding to second flow information of a packet flow.

Second PFD information of the packet flow is sent to a third network node in response to determining that 3-tuple information corresponding to the packet flow is changed from first 3-tuple information to second 3-tuple information or is newly added second 3-tuple information, where the second PFD information includes the second 3-tuple information and the application ID.

In some optional embodiments of the present disclosure, the operation that the first network node identifies the application ID corresponding to the second flow information of the packet flow includes the following operation.

The first network node determines the application ID corresponding to the second flow information of the packet flow according to a pre-obtained application classifier or traffic characteristic.

In some optional embodiments of the present disclosure, the method further includes the following operation.

The first network node receives the application classifier or the traffic characteristic from a second network node. The application classifier and the traffic characteristic are determined based on first PFD information and first flow information corresponding to each application ID, and the first PFD information includes the first 3-tuple information.

In some optional embodiments of the present disclosure, the first network node is a UPF network node, or an NWDAF network node, or a UPF and NWDAF combined network node.

In a second aspect, the embodiments of the present disclosure also provide a data transmission method, which includes the following operations.

A third network node receives second PFD information from a first network node, the second PFD information including second 3-tuple information and an application ID.

The second PFD information is sent to a UPF node via an SMF.

In some optional embodiments of the present disclosure, the method further includes that: first PFD information corresponding to the application ID is updated to the second PFD information.

In a third aspect, the embodiments of the present disclosure also provide a data transmission method, which includes the following operation.

A UPF node receives second PFD information from a third network node via an SMF, the second PFD information including second 3-tuple information and an application ID.

In some optional embodiments of the present disclosure, the method further includes that: second flow information of a packet flow corresponding to the second 3-tuple information is collected, an application ID of the packet flow is determined, and a PCC policy corresponding to the second 3-tuple information and the application ID is executed.

In a fourth aspect, the embodiments of the present disclosure also provide a network node. The network node is a first network node and includes an identification unit, a determination unit and a first sending unit.

The identification unit is configured to identify an application ID corresponding to second flow information of a packet flow.

The determination unit is configured to determine whether 3-tuple information corresponding to the packet flow is changed.

The first sending unit is configured to send, when the determination unit determines that the 3-tuple information corresponding to the packet flow is changed from first 3-tuple information to second 3-tuple information or is newly added second 3-tuple information, second PFD information of the packet flow to a third network node, the second PFD information including the second 3-tuple information and the application ID.

In some optional embodiments of the present disclosure, the identification unit is configured to determine the application ID corresponding to the second flow information of the packet flow according to a pre-obtained application classifier or traffic characteristic.

In some optional embodiments of the present disclosure, the network node further includes a first receiving unit, configured to receive the application classifier or the traffic characteristic from a second network node. The application classifier and the traffic characteristic are determined based on first PFD information and first flow information corresponding to each application ID, and the first PFD information may include the first 3-tuple information.

In some optional embodiments of the present disclosure, the network node is a UPF network node, or an NWDAF network node, or a UPF and NWDAF combined network node.

In a fifth aspect, the embodiments of the present disclosure also provide a network node. The network node is a third network node. The third network node includes a second receiving unit and a second sending unit.

The second receiving unit is configured to receive second PFD information from a first network node, the second PFD information including second 3-tuple information and an application ID.

The second sending unit is configured to send second PFD information to a UPF node via an SMF.

In some optional embodiments of the present disclosure, the network node further includes an update unit, configured to update first PFD information corresponding to the application ID to the second PFD information.

In a sixth aspect, the embodiments of the present disclosure also provide a UPF node, which includes a third receiving unit, configured to receive second PFD information from a third network node via an SMF, the second PFD information including second 3-tuple information and an application ID.

In some optional embodiments of the present disclosure, the UPF node further includes an execution unit, configured to collect second flow information of a packet flow corresponding to the second 3-tuple information, determine an application ID of the packet flow, and execute a PCC policy corresponding to the second 3-tuple information and the application ID.

In a seventh aspect, the embodiments of the present disclosure also provide a computer-readable storage medium, on which a computer program is stored. When executed by a processor, the program implements the operations of the method in the first aspect, the second aspect or the third aspect of the embodiments of the present disclosure.

In an eighth aspect, the embodiments of the present disclosure also provide a network node, including a memory, a processor, and a computer program stored on the memory and executable by the processor. When executing the program, the processor implements the operations of the method in the first aspect, the second aspect or the third aspect of the embodiments of the present disclosure.

The data transmission method, the related network node and the storage medium are provided in the embodiments of the present disclosure. The method includes that: the first network node identifies the application ID corresponding to the second flow information of the packet flow; when it is determined that the 3-tuple information corresponding to the packet flow is changed from the first 3-tuple information to the second 3-tuple information or is the newly added second 3-tuple information, the second PFD information of the packet flow is sent to the third network node; the second PFD information includes the second 3-tuple information and the application ID; the third node receives the second PFD information from the first network node; and the second PFD information is sent to the UPF node via the SMF. Using the technical solutions of the embodiments of the present disclosure, when it is detected that the 3-tuple information of the packet flow changes or is the newly added 3-tuple information (namely, the second 3-tuple information), the second PFD information containing the second 3-tuple information and the application ID is updated to the third network node, and is sent to the UPF node via the SMF, so that the UPF node timely obtains the newly added 3-tuple information or the changed 3-tuple information, so as to achieve the accurate parsing of a data message and the execution of the related PCC policy.

DETAILED DESCRIPTION

The present disclosure is elaborated in detail below in conjunction with the drawings and specific embodiments.

Figure 1:
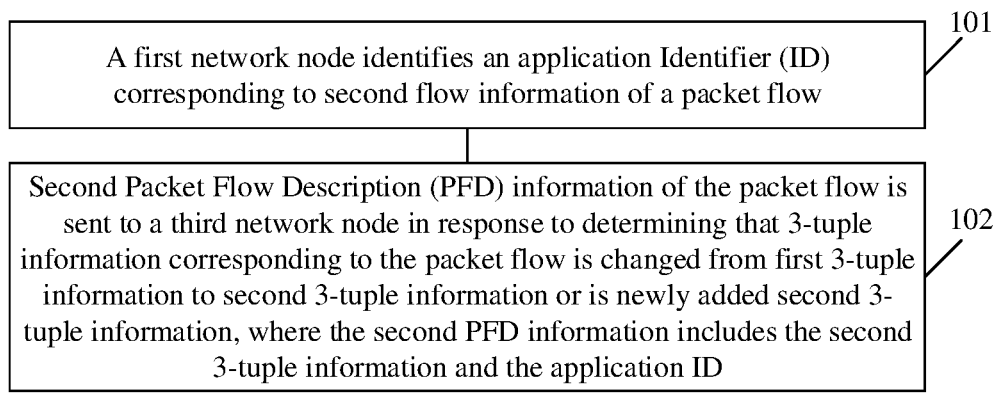
FIG. 1 is a first flowchart of a data transmission method according to an embodiment of the present disclosure.

The embodiments of the present disclosure provide a data transmission method. FIG. 1 is a first flowchart of a data transmission method according to an embodiment of the present disclosure. As illustrated in FIG. 1, the data transmission method includes the following operations.

At 101, a first network node identifies an application ID corresponding to second flow information of a packet flow.

At 102, second Packet Flow Description (PFD) information of the packet flow is sent to a third network node in response to determining that 3-tuple information corresponding to the packet flow is changed from first 3-tuple information to second 3-tuple information or is newly added second 3-tuple information, where the second PFD information includes the second 3-tuple information and the application ID.

In the embodiment, the first network node may be a network device having a Network Data Analytics Function (NWDAF). In some examples, the first network node may be an independent network device. In other embodiments, the first network node may be a combination of the NWDAF and a UPF. The first network node in the embodiment is a UPF network node, or an NWDAF network node, or a UPF and NWDAF combined network node.

In the embodiment, the third network node may be at least one of an NEF node, a Packet Flow Description Function (PFDF) node, a Unified Data Repository (UDR) node, or a Unified Data Management (UDM) node.

In the embodiment, the first network node identifies the application ID corresponding to the second flow information of the packet flow, that is, the first network node can identify which traffic the packet flow corresponds to.

In some optional embodiments of the present disclosure, the operation that the first network node identifies the application ID corresponding to the second flow information of the packet flow includes that: the first network node determines the application ID corresponding to the second flow information of the packet flow according to a pre-obtained application classifier (which can be denoted as Application Classifier) or traffic characteristic (which can be denoted as Traffic Signature or Traffic Feature).

Optionally, the method further includes that: the first network node receives the application classifier or the traffic characteristic from a second network node. The application classifier and the traffic characteristic are determined based on first PFD information and first flow information corresponding to each application ID, and the first PFD information includes the first 3-tuple information.

In the embodiment, the second network node determines the application classifier or the traffic characteristic based on the first PFD information and the first flow information corresponding to each application ID, and then sends the application classifier or the traffic characteristic to the first network node. Alternatively, the first network node can obtain the application classifier or the traffic characteristic through other transmission modes.

Exemplarily, the second network node may be a network device having an NWDAF. In some examples, the second network node may be an independent network device.

The second network node determines the application classifier or the traffic characteristic based on the first PFD information and the first flow information corresponding to each application ID. The PFD information (including the first PFD information, the second PFD information, etc.) in the embodiment corresponds to each application, and it is to be understood that the PFD information (including the first PFD information, the second PFD information, etc.) corresponds to the same application ID. Exemplarily, the PFD information may include at least one of the following: an IP 3-tuple (such as an IP address, a port and a transport layer protocol), a Uniform Resource Locator (URL) (such as a host name), a domain name (such as a Fully Qualified Domain Name (FQDN)), or the application ID.

In some embodiments, the traffic characteristic contains the commonality of the features of the packet flows corresponding to the same application ID, or the traffic characteristic can identify the corresponding unique application ID. For example, the traffic characteristic may include mapping relationships between a plurality of sets of features and application IDs. After obtaining the packet flow, the first network node obtains the feature of the packet flow, and compares the obtained feature with each mapping relationship in the traffic characteristic to obtain an application ID corresponding to the feature.

In other embodiments, the application classifier is obtained by training multiple times through a machine learning algorithm. Input data of the application classifier may be the flow information or the PFD information, and output data is the application ID.

Based on this, the first network node identifies the application ID corresponding to the second flow information of the packet flow based on the obtained application classifier or a feature mapping set.

In the embodiment, after identifying respective 3-tuple information of each data flow and the corresponding application ID, the first network node stores the 3-tuple information corresponding to the packet flow. If it is found that the 3-tuple information of the packet flow is not matched with the stored 3-tuple information, it is determined that the 3-tuple information of the packet flow is changed. For example, the stored 3-tuple information is denoted as the first 3-tuple information, and if the detected 3-tuple information is the second 3-tuple information, it is determined that the 3-tuple information of the packet flow is changed from the first 3-tuple information to the second 3-tuple information. Alternatively, for the packet flow, no related 3-tuple information is stored, but 3-tuple information of the packet flow (namely, the newly added second 3-tuple information) is detected, and then the detected 3-tuple information serves as the newly added second 3-tuple information. The above "determine" may be equivalent to derive or determine.

In a case where it is determined (or detected) that the 3-tuple information is changed, or the newly added 3-tuple information is determined (or detected), the first network node sends the second PFD information containing the second 3-tuple information and the application ID to the third network node, and the third network node sends the second PFD information containing the second 3-tuple information and the application ID to the UPF via the SMF.

Figure 2:
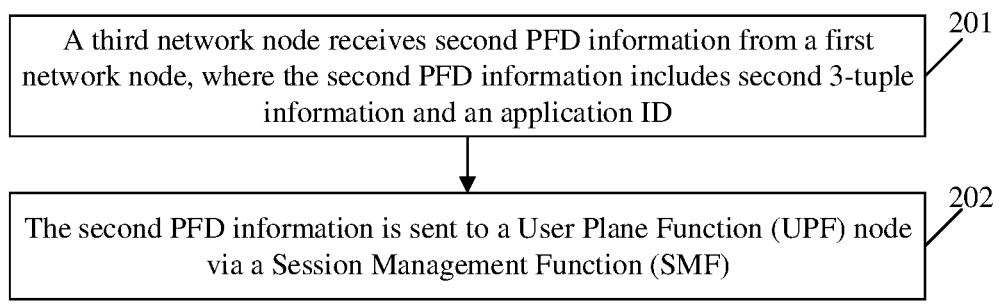
FIG. 2 is a second flowchart of a data transmission method according to an embodiment of the present disclosure.

Based on this, the embodiments of the present disclosure also provide a data transmission method. FIG. 2 is a second flowchart of a data transmission method according to an embodiment of the present disclosure. As illustrated in FIG. 2, the data transmission method includes the following operations.

At 201, a third network node receives second PFD information from a first network node, where the second PFD information includes second 3-tuple information and an application ID.

At 202, the second PFD information is sent to a UPF node via an SMF.

In the embodiment, the third network node may be at least one of an NEF node, a PFDF node, a UDR node, or a UDM node.

In some optional embodiments of the present disclosure, the method further includes that: first PFD information corresponding to the application ID is updated to the second PFD information.

It is to be understood that the PFD information corresponding to the application ID is stored in the third network node. Before receiving the second PFD information, the first PFD information is stored in the third network node, where the first PFD information includes first 3-tuple information. After receiving the second PFD information, the second PFD information is stored and the first PFD information is deleted.

Figure 3:
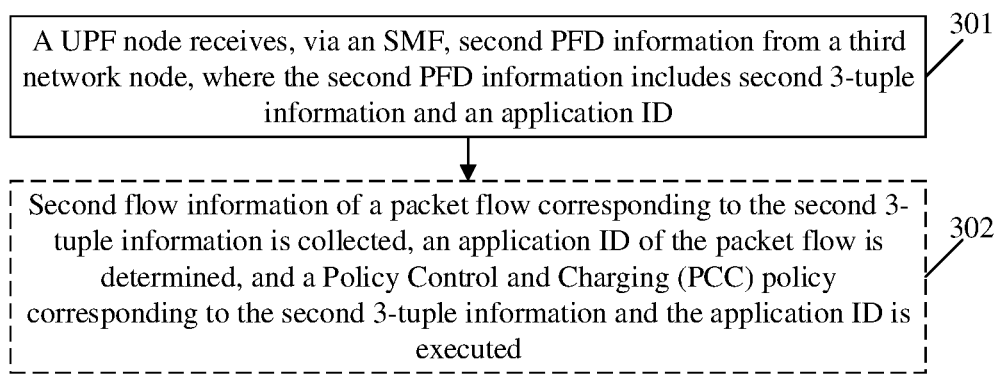
FIG. 3 is a third flowchart of a data transmission method according to an embodiment of the present disclosure.

Based on the above embodiments, the embodiments of the present disclosure also provide a data transmission method. FIG. 3 is a third flowchart of a data transmission method according to an embodiment of the present disclosure. As illustrated in FIG. 3, the data transmission method includes the following operation.

At 301, a UPF node receives, via an SMF, second PFD information sent by a third network node, where the second PFD information includes second 3-tuple information and an application ID.

In some optional embodiments of the present disclosure, the method may further include the following operation.

At 302, second flow information of a packet flow corresponding to the second 3-tuple information is collected, an application ID of the packet flow is determined, and a PCC policy corresponding to the second 3-tuple information and the application ID is executed.

The data transmission method in the embodiment of the present disclosure will be described in conjunction with a specific example.

Figure 4:
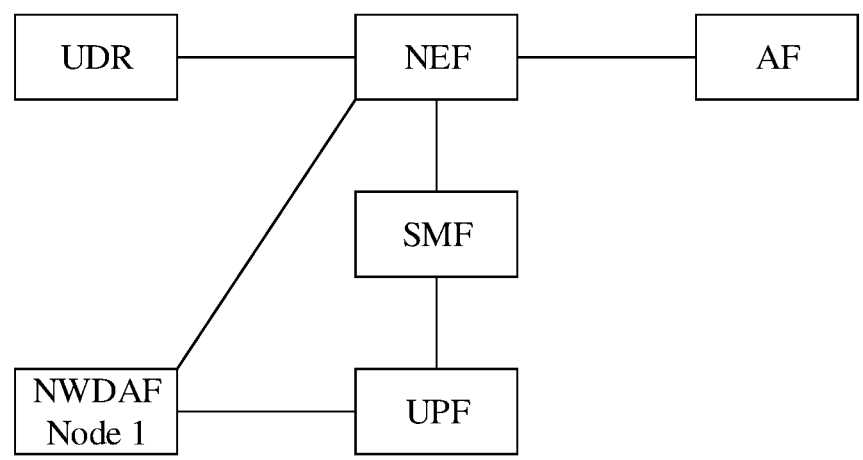
FIG. 4 is a schematic diagram of a system architecture to which a data transmission method is applied according to an embodiment of the present disclosure.

FIG. 4 is a schematic diagram of a system architecture to which a data transmission method is applied according to an embodiment of the present disclosure. As illustrated in FIG. 4, a system may include a Unified Data Repository (UDR), an NEF, an SMF, a UPF, an NWDAF node (namely, a second network node in the above embodiments), etc. Assuming that the NEF is the third network node in the above embodiments, the NEF node can store PFD information into the UDR and read PFD information from the UDR, and the NWDAF node can obtain first PFD information, etc. from the NEF. The method may specifically include the following operations.

At S1, an NWDAF node 1 determines an application classifier or a traffic characteristic corresponding to an Application ID based on first PFD information and the first flow information corresponding to the Application ID.

The first PFD information may also be referred to as historical PFD information, and the first flow information may also be referred to as historical flow information.

The NWDAF node 1 obtains the first PFD information from the NEF and obtains the first flow information from the UPF.

At S2, the NWDAF node 1 sends the application classifier or traffic characteristic of the Application ID to an NWDAF node 2.

The NWDAF node 2 may be co-located with the UPF.

At S3, the NWDAF node 2 determines an Application ID and IP 3-tuple information corresponding to a real-time packet flow, the IP 3-tuple here is denoted as first IP 3-tuple information.

At S4, as S3 continues, the NWDAF node 2 finds that the packet flow corresponds to new IP 3-tuple information (denoted as second IP 3-tuple information here) during parsing the packet flow, and then sends PFD information (denoted as second PFD information here, the second PFD information including the second IP 3-tuple information and the Application ID) to the NEF.

At S5, the NEF updates PFD information corresponding to the Application ID as the second PFD information, and distributes the updated second PFD information to a related UPF via the SMF.

At S6, based on the second PFD information, when the UPF parses that a packet flow corresponding to a second IP 3-tuple appears, an Application ID corresponding to the packet flow is determined, a corresponding PCC policy is executed, and an execution result is reported to the SMF.

Using the technical solutions of the embodiments of the present disclosure, when it is detected that the 3-tuple information of the packet flow changes or is the newly added 3-tuple information (namely, the second 3-tuple information), the second PFD information containing the second 3-tuple information and the application ID is updated to the NEF, and is sent to the UPF via the SMF, so that the UPF timely obtains the newly added 3-tuple information or the changed 3-tuple information, so as to achieve the accurate parsing of a data message and the execution of the related PCC policy.

Figure 5:
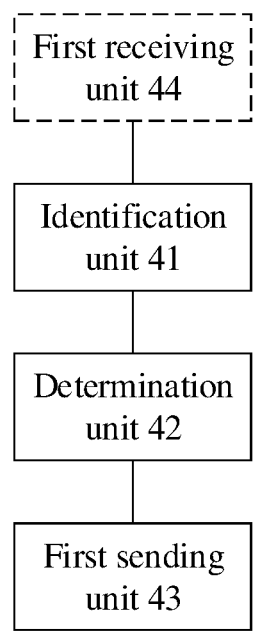
FIG. 5 is a first schematic diagram of a composition structure of a network node according to an embodiment of the present disclosure.

The embodiments of the present disclosure also provide a network node. The network node is a first network node in the above embodiments. FIG. 5 is a first schematic diagram of a composition structure of a network node according to an embodiment of the present disclosure. As illustrated in FIG. 5, the network node includes an identification unit 41, a determination unit 42 and a first sending unit 43.

The identification unit 41 is configured to identify an application ID corresponding to second flow information of a packet flow.

The determination unit 42 is configured to determine whether 3-tuple information corresponding to the packet flow is changed.

The first sending unit 43 is configured to send, when the determination unit 42 determines that the 3-tuple information corresponding to the packet flow is changed from first 3-tuple information to second 3-tuple information or is newly added second 3-tuple information, second PFD information of the packet flow to a third network node, the second PFD information including the second 3-tuple information and the application ID.

In some optional embodiments of the present disclosure, the identification unit 41 is configured to determine the application ID corresponding to the second flow information of the packet flow according to a pre-obtained application classifier or traffic characteristic.

In some optional embodiments of the present disclosure, the network node further includes a first receiving unit 44. The first receiving unit is configured to receive the application classifier or the traffic characteristic from a second network node. The application classifier and the traffic characteristic are determined based on first PFD information and first flow information corresponding to each application ID.

In some optional embodiments of the present disclosure, the network node is a UPF network node, or an NWDAF network node, or a UPF and NWDAF combined network node.

In the embodiments of the present disclosure, the network node is the first network node in the above embodiments. The identification unit 41 and the determination unit 42 in the network node are both implemented by a Central Processing Unit (CPU), a Digital Signal Processor (DSP), a Microcontroller Unit (MCU) or a Field-Programmable Gate Array (FPGA) in the network node in practical application. The first sending unit 43 and the first receiving unit 44 in the network node may be implemented by communication modules (including a basic communication suite, an operating system, a communication module, a standardized interface and a protocol, etc.) and a transceiver antenna in practical application.

It is to be noted that the network node provided by the above embodiments is only exemplified by the division of the above program modules when performing data transmission. In practical application, the above processing and allocation may be completed by different program modules as needed, that is, the internal structure of the network node is divided into different program modules to complete all or part of the above-described processing. In addition, the embodiments of the network node and the data transmission method provided by the embodiments belong to the same concept, and the detailed implementation processes thereof are detailed in the method embodiments and are not repeated here.

Figure 6:
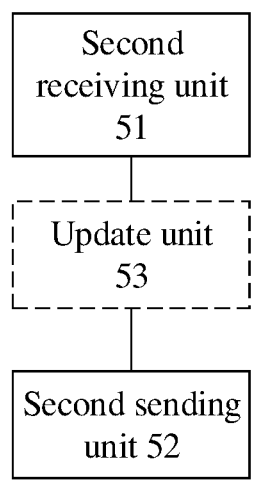
FIG. 6 is a second schematic diagram of a composition structure of a network node according to an embodiment of the present disclosure.

The embodiments of the present disclosure also provide a network node. The network node is a third network node in the above embodiments. FIG. 6 is a second schematic diagram of a composition structure of a network node according to an embodiment of the present disclosure. As illustrated in FIG. 6, the network node includes a second receiving unit 51 and a second sending unit 52.

The second receiving unit 51 is configured to receive second PFD information from a first network node, the second PFD information including second 3-tuple information and an application ID.

The second sending unit 52 is configured to send second PFD information to a UPF node via an SMF.

In some optional embodiments of the present disclosure, the network node further includes an update unit 53, configured to update first PFD information corresponding to the application ID to the second PFD information.

In the embodiments of the present disclosure, the network node is the third network node in the above embodiments. The update unit 53 in the network node may be implemented by a CPU, a DSP, an MCU or an FPGA in the network node in practical application. The second receiving unit 51 and the second sending unit 52 in the network node may be implemented by communication modules (including a basic communication suite, an operating system, a communication module, a standardized interface and a protocol, etc.) and a transceiver antenna in practical application.

It is to be noted that the network node provided by the above embodiments is only exemplified by the division of the above program modules when performing data transmission. In practical application, the above processing and allocation may be completed by different program modules as needed, that is, the internal structure of the network node is divided into different program modules to complete all or part of the above-described processing. In addition, the embodiments of the network node and the data transmission method provided by the embodiments belong to the same concept, and the detailed implementation processes thereof are detailed in the method embodiments and are not repeated here.

Figure 7:
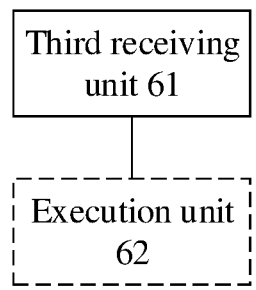
FIG. 7 is a schematic diagram of a composition structure of a UPF node according to an embodiment of the present disclosure.

The embodiments of the present disclosure also provide a UPF node. FIG. 7 is a schematic diagram of a composition structure of a UPF node according to an embodiment of the present disclosure. As illustrated in FIG. 7, the UPF node includes a third receiving unit 61, configured to receive, via an SMF, second PFD information from a third network node. The second PFD information includes second 3-tuple information and an application ID.

In some optional embodiments of the present disclosure, the UPF node further includes an execution unit 62, configured to collect second flow information of a packet flow corresponding to the second 3-tuple information, determine an application ID of the packet flow, and execute a PCC policy corresponding to the second 3-tuple information and the application ID.

In the embodiments of the present disclosure, the execution unit 62 in the UPF node may be implemented by a CPU, a DSP, an MCU or an FPGA in the UPF node in practical application. The third receiving unit 61 in the UPF node may be implemented by communication modules (including a basic communication suite, an operating system, a communication module, a standardized interface and a protocol, etc.) and a transceiver antenna in practical application.

It is to be noted that the UPF node provided by the above embodiments is only exemplified by the division of the above program modules when performing data transmission. In practical application, the above processing and allocation may be completed by different program modules as needed, that is, the internal structure of the UPF node is divided into different program modules to complete all or part of the above-described processing. In addition, the embodiments of the UPF node and the data transmission method provided by the embodiments belong to the same concept, and the detailed implementation processes thereof are detailed in the method embodiments and are not repeated here.

Figure 8:
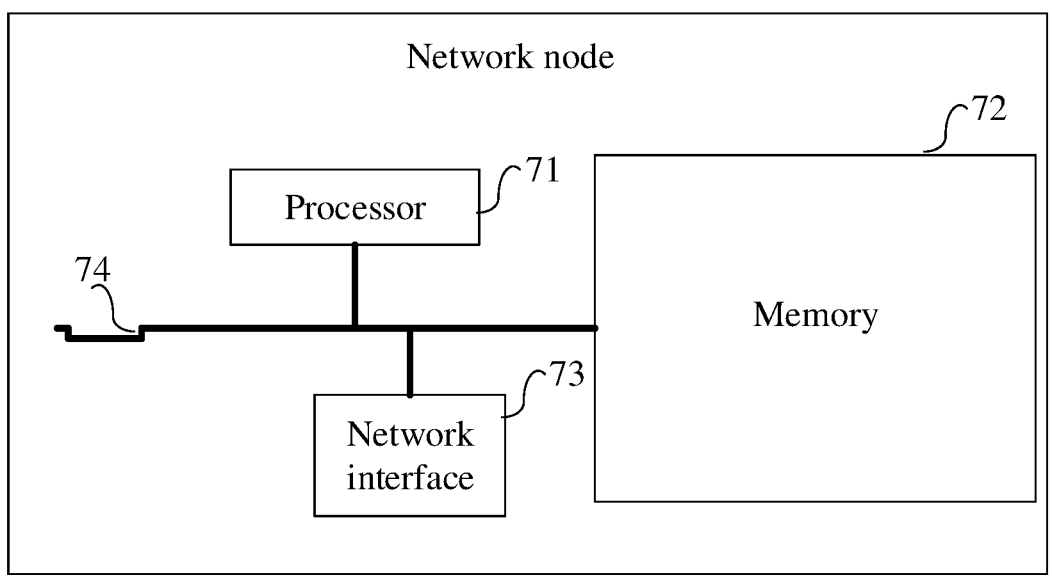
FIG. 8 is a schematic diagram of a hardware structure of a network node according to an embodiment of the present disclosure.

The embodiments of the present disclosure also provide a network node. The network node is a first network node, a third network node or a UPF node in the above embodiments specifically. FIG. 8 is a schematic diagram of a hardware structure of a network node according to an embodiment of the present disclosure. As illustrated in FIG. 8, the network node includes a memory 72, a processor 71 and a computer program stored on the memory 72 and executable by the processor 71. When executing the program, the processor 71 performs the operations of the data transmission method applied to the first network node, the third network node or the UPF node in the embodiments of the present disclosure.

Optionally, the network node further includes one or more network interfaces 73. Various components of the network node are coupled together through a bus system 74. It is to be understood that the bus system 74 is configured to implement the connection communication between these components. The bus system 74 further includes a power bus, a control bus and a status signal bus in addition to a data bus. However, for clarity of illustration, the various buses are labeled as the bus system 74 in FIG. 8.

It is to be understood that the memory 72 may be a volatile memory or a non-volatile memory, or may include both a volatile memory and a non-volatile memory. Herein, the non-volatile memory may be a Read Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. By way of example, but not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 72 described in the embodiments of the present disclosure is intended to include, but is not limited to, these and any other suitable types of memory.

The methods disclosed in the embodiments of the present disclosure described above may be applied to the processor 71 or implemented by the processor 71. The processor 71 may be an integrated circuit chip with signal processing capabilities. In an implementation process, each step of the method may be completed by an integrated logical circuit of hardware in the processor 71 or one or more instructions in a software form. The above processor 71 may be a general-purpose processor, a DSP, or other programmable logic devices, discrete gate or transistor logic devices, discrete hardware components, or the like. Various methods, operations, and logic block diagrams disclosed in the embodiments of the present disclosure may be implemented or executed by the processor 71. The general-purpose processor may be a microprocessor or any conventional processor, etc. The operations of the method disclosed in combination with the embodiment of the present disclosure may be directly embodied as a hardware decoding processor for execution and completion, or a combination of hardware and software modules in the decoding processor for execution and completion. The software module may be located in a storage medium, which is located in the memory 72, and the processor 71 reads information from the memory 72, and completes the operations of the foregoing method in combination with hardware.

In an exemplary embodiment, the network node may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, Microprocessors, or other electronic components, and is configured to execute the foregoing method.

In the exemplary embodiment, the embodiments of the present disclosure also provide a computer-readable storage medium, such as a memory 72 including a computer program, which may be executed by the processor 71 of the network node to complete the operations of the foregoing method. The computer-readable storage medium may be the memory such as an FRAM, an ROM, a PROM, an EPROM, an EEPROM, a Flash Memory, a magnetic surface memory, an optical disk, or a CD-ROM, and may also be various devices including one or any combination of the above memories.

The embodiments of the present disclosure also provide a computer-readable storage medium, on which a computer program is stored. When executed by a processor, the program implements the operations of the data transmission method applied to the first network node, the third network node or the UPF node in the embodiments of the present disclosure.

The methods disclosed in several method embodiments provided in the present disclosure may be arbitrarily combined without conflict to obtain a new method embodiment.

The characteristics disclosed in several product embodiments provided in the present disclosure may be arbitrarily combined without conflict to obtain a new product embodiment.

The characteristics disclosed in the several method or device embodiments provided in the present disclosure may be arbitrarily combined without conflict to obtain a new method embodiment or device embodiment.

In the several embodiments provided in the present disclosure, it is to be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection through some interfaces, devices or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, function units in the embodiments of the present disclosure may be integrated into a processing unit, each unit may also serve as an independent unit and two or more than two units may also be integrated into a unit. The integrated unit may be implemented in a hardware form and may also be implemented in form of hardware and software function unit.

Those of ordinary skill in the art can understand that all or part of the operations of the above method embodiments may be completed by a related hardware instructed by program instructions. The foregoing program may be stored in a computer-readable storage medium. When the program is executed, the operations of the above method embodiments are performed. The foregoing storage medium includes: various media capable of storing program codes such as a mobile storage device, an ROM, an RAM, a magnetic disk, or an optical disk.

Alternatively, the integrated unit of the present disclosure may also be stored in a computer-readable storage medium if being implemented in the form of a software functional module and sold or used as a standalone product. Based on such an understanding, the technical solutions of the embodiments of the present disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the operations of the method in each embodiment of the present disclosure. The foregoing storage medium includes: various media capable of storing program codes such as a mobile storage device, an ROM, an RAM, a magnetic disk, or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A method for data transmission, comprising:
identifying, by a first Network Function, an application Identifier (ID) corresponding to second flow information of a packet flow; and
sending second Packet Flow Description (PFD) information of the packet flow to a third Network Function in case that the first Network Function derives that 3-tuple information corresponding to the packet flow is changed from first 3-tuple information to second 3-tuple information or is newly added second 3-tuple information, wherein the second PFD information comprises the second 3-tuple information and the application ID.

2. The method of claim 1, wherein identifying, by the first Network Function, the application ID corresponding to the second flow information of the packet flow comprises:
deriving, by the first Network Function, the application ID corresponding to the second flow information of the packet flow according to a pre-obtained application classifier or traffic characteristic.

3. The method of claim 1, further comprising:
receiving, by the first Network Function, an application classifier or traffic characteristic from a second Network Function, wherein the application classifier and the traffic characteristic are determined based on first PFD information and first flow information corresponding to each application ID, and the first PFD information comprises the first 3-tuple information.

4. The method of claim 3, wherein the first PFD information is historical PFD information, and the first flow information is historical flow information.

5. The method of claim 3, wherein the traffic characteristic comprises a mapping relationship between a plurality of sets of features and application IDs, the application classifier is obtained by training through a machine learning algorithm, input data of the application classifier is flow information or PFD information, and output data of the application classifier is the application IDs.

6. The method of claim 3, wherein the second Network Function is a network device having a Network Data Analytics Function (NWDAF).

7. The method of claim 1, wherein the first Network Function is a User Plane Function (UPF), or a Network Data Analytics Function (NWDAF), or a UPF and NWDAF combined Network Function.

8. The method of claim 1, wherein the third Network Function comprises at least one of a Network Exposure Function (NEF), a Packet Flow Description Function (PFDF), a Unified Data Repository (UDR), or a Unified Data Management (UDM).

9. A method for data transmission, comprising:
receiving, by a third Network Function, second Packet Flow Description (PFD) information from a first Network Function, wherein the second PFD information comprises second 3-tuple information and an application Identifier (ID), and the second PFD information is received from the first Network Function in case that the first Network Function derives that 3-tuple information corresponding to a packet flow is changed from first 3-tuple information to the second 3-tuple information or is newly added second 3-tuple information; and
sending the second PFD information to a User Plane Function (UPF) via a Session Management Function (SMF).

10. The method of claim 9, further comprising:
updating first PFD information corresponding to the application ID to the second PFD information.

11. The method of claim 9, wherein the third Network Function comprises at least one of a Network Exposure Function (NEF), a Packet Flow Description Function (PFDF), a Unified Data Repository (UDR), or a Unified Data Management (UDM).

12. A method for data transmission, comprising:
receiving, by a User Plane Function (UPF) via a Session Management Function (SMF), second Packet Flow Description (PFD) information from a third Network Function, wherein the second PFD information comprises second 3-tuple information and an application Identifier (ID), and the second PFD information is sent by a first Network Function to the third Network Function in case that the first Network Function derives that 3-tuple information corresponding to a packet flow is changed from first 3-tuple information to the second 3-tuple information or is newly added second 3-tuple information.

13. The method of claim 12, further comprising:
collecting second flow information of the packet flow corresponding to the second 3-tuple information;
deriving an application ID of the packet flow; and
executing a Policy Control and Charging (PCC) policy corresponding to the second 3-tuple information and the application ID.

* * * * *